United States Patent [19]

Bolosky et al.

[11] Patent Number: 5,485,574
[45] Date of Patent: Jan. 16, 1996

[54] OPERATING SYSTEM BASED PERFORMANCE MONITORING OF PROGRAMS

[75] Inventors: William J. Bolosky, Issaquah; Richard F. Rashid, Woodinville, both of Wash.

[73] Assignee: Microsoft Corporation, Redmond, Wash.

[21] Appl. No.: 147,645

[22] Filed: Nov. 4, 1993

[51] Int. Cl.$^6$ .................................................. G06F 11/34
[52] U.S. Cl. ............................... 395/183.11; 395/184.01; 395/650
[58] Field of Search .............................. 395/575, 183.11, 395/650, 184.01; 371/19

[56] References Cited

U.S. PATENT DOCUMENTS

| | | | |
|---|---|---|---|
| 4,845,615 | 7/1989 | Blasciak | 364/200 |
| 4,866,665 | 9/1989 | Haswell-Smith | 364/900 |
| 5,047,919 | 9/1991 | Sterling | 364/200 |
| 5,103,394 | 4/1992 | Blasciak | 395/575 |
| 5,355,487 | 10/1994 | Keller et al. | 395/650 |

FOREIGN PATENT DOCUMENTS

| | | | |
|---|---|---|---|
| 0526055 | 2/1993 | European Pat. Off. | G06F 11/00 |

OTHER PUBLICATIONS

UNIX System V/386 Release 3.2 Programmer's Guide, vol. II, Prentice Hall, 1989, pp. 18–29 to 18–60.
UNIX System V/386 Release 3.2 Programmer's Reference Manual, Prentice Hall 1989, pp. lint(1) 1–3; lprof(1) 1–3 prof(1) 1–2; monitor(3c) 1–2; prof(5)1.
Unix International, UNIX–Based Measurement Architecture (UMA): Functional Charastics of the UMA API, Mar. 7, 1991.
Power, L. R., "Design and use of a program execution analyzer," *IBM Systems Journal* 22(3) 271–294, 1983.
"Translation of Date Generated by the AIX 3.2 Trace Facility Into a Format for Visualization of the Data," *IBM® Technical Disclosure Bulletin* 36(7):39–42, Jul. 1993.
Eggers, Susan J. et al., "Techniques for Efficient Inline Tracing on a Shared–Memory Multiprocessor," In Proceedings of the ACM Sigmetrics Conference on Measurement and Modelling of Computer Systems (published as Performance Evaluation Review, 18:1); pp. 37–47; 1990.
Graham, Susan L. et al., "an Execution Profiler for Modular Programs," Software Practice and Experience 13; pp. 671–685, 1983.
Kessler, Peter B., "Fast Breakpoints: Design and Implementation," In Proceedings of the ACM Sigplan '90 conference on Programming Language Design and Implementation (published as Sigplan Notices); ACM, White Plains, N.Y.; pp. 78–84; Jun., 1990.
Larus, James R., "Abstract Execution: A Technique for Efficiently Tracing Programs," Software Practice and Experience 20(12); pp. 1241–1258; Dec., 1990.
Miller, Barton P. et al., "IPS–2: The Second Generation of a Parallel Program Measurement System," Computer Sciences Technical Report #783, University of Wisconsin, Computer Sciences Department; pp. 1–22, Aug., 1988.
Ponder, Carl, and Richard J. Fateman; "Inaccuracies in Program Profilers," Software Practice and Experience 18(5); pp. 459–467; May, 1988.
Lamport, Leslie, "Concurrent Reading and Writing of Clocks," Digital Equipment Corporation Reserch Report 27, Systems Reserch Center; pp. 1–7; Apr. 1, 1988.

(List continued on next page.)

*Primary Examiner*—Robert W. Beausoliel, Jr.
*Assistant Examiner*—Alan M. Fisch
*Attorney, Agent, or Firm*—Seed and Berry

[57] ABSTRACT

An operating provides a facility within its kernel for monitoring program performance. The facility may monitor user level programs as well as portions of the operating system, such as the kernel. The facility counts instructions and/or function calls to provide a useful performance metric to a user of the system. The count is forwarded to a user level monitoring program. The inclusion of the facility within the kernel enhances the speed of performance monitoring and enables the operating system to be directly monitored by the facility.

22 Claims, 5 Drawing Sheets

OTHER PUBLICATIONS

UMIPS–V Reference Manual (pixie and pixstates); MIPS Computer Systems, Inc., Sunnyvale, Calif., 1990.

Wendorf, James W., "Operating System/Application Concurrency in Tightly–Coupled Multiple–Processor Systems," PhD Thesis, Carnegie Mellon University, Department of Computer Science, Pittsburgh, Pa.; pp. 1–168; Aug., 1987.

Wirth, Niklaus, and C. A. R. Hoare, "A Contribution to the Development of ALGOL," Communications of the ACM 9(6); pp. 413–431; Jun., 1966.

Black, David L., "The Mach timing Facility: An Implementation of Accurate Low–Overhead Usage Timing," Usinex Mach Workshop Proceedings, Burlington, Vt.; pp. 53–71; Oct. 4–5, 1990.

OPERATING SYSTEM BASED PERFORMANCE MONITORING OF PROGRAMS

TECHNICAL FIELD

The present invention relates generally to data processing systems and, more particularly, to performance monitoring of programs run on data processing systems.

BACKGROUND OF THE INVENTION

A number of different statistical techniques have been developed for monitoring performance of a program run on a data processing system. One of the most prominent techniques is to monitor the time spent in executing respective functions of the program. One difficulty with this approach is that in many instances the granularity of the clock used in timing the functions is too large to provide an accurate picture of how processing time is distributed amongst the respective functions. Instruction counting is another statistical technique for monitoring performance of a program. Instruction counting techniques have generally been limited to monitoring the performance of user level programs (as opposed to system level programs), such as application programs. These techniques have not been applicable to monitoring the performance of operating system kernels. As a result of these limitations, statistical techniques have often not been useful to a programmer to help him enhance program performance.

SUMMARY OF THE INVENTION

A method is practiced in a data processing system having a processor for executing instructions and a storage mechanism for storing an operating system and a user level monitoring program. The processor executes instructions at a user level and a system level. The data processing system may be a distributed system. In this method, a facility is provided in the kernel of the operating system to monitor program performance. For instance, the facility may count the instructions executed by the processor, count the number of times that a section of code has been called during execution of a program or provide a number of separate counts categorized by function that specify the number of instructions executed in the respective functions. A section of code of a program is executed on the processor. The facility in the kernel of the operating system is then used to monitor system performance. The type of facility used determines the values that are counted by the facility. The counts are reported to the user level monitoring program. For example, the facility may count the number of instructions when executing a section of code of the program or may count the number of times that a section of code of the program is called or the facility may provide separate counts categorized by function with instructions executed in the functions when a first function is called during execution of the program. The program may be a user level program or part of the kernel of the operating system.

DETAILED DESCRIPTION OF THE INVENTION

A preferred embodiment of the present invention provides a facility within the kernel of an operating system to monitor performance of programs. The facility provides a user with a number of options. First, The facility allows a user to count the number of instructions executed by a function each time that the function is called. Second, the facility allows the user to count the number and frequency of calls to a particular function without counting the instructions executed in the function, and third, the facility allows the user to count the number of instructions executed in each function that is called as a result of calling an initial function. Since the facility is provided in the kernel of the operating system, it may be used not only to monitor the performance of user level programs, such as application programs, but also may be used to monitor the performance of the kernel and other portions of the operating system. Providing the facility within the kernel of the operating system also enhances the speed of monitoring and provides a nonintrusive approach to performance monitoring that does not require any modifications to the program being monitored.

Figure 1:
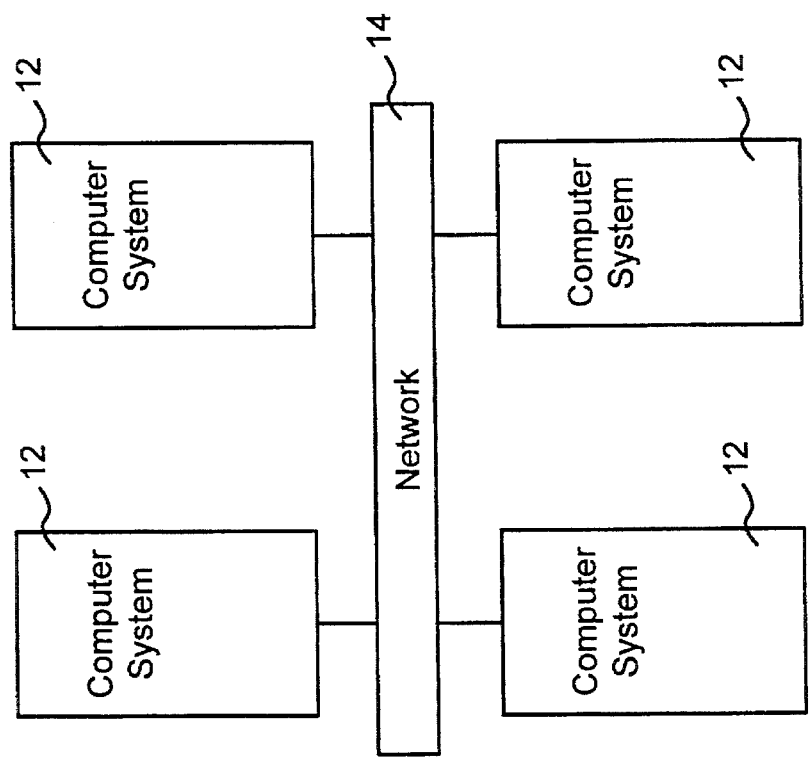
FIG. 1 is a block diagram of a distributed system for practicing a preferred embodiment of the present invention.

The preferred embodiment of the present invention may be used in a distributed system 10 like that shown in FIG. 1. It should also be appreciated that the present invention may be practiced in single processor system. The distributed system includes a number of computer systems 12 that communicate through a network 14. Each of the computer systems 10 may concurrently run a trace on the program it is executing. The network may be any of a number of different types of networks, including local area networks (LANs) or wide area networks. Those skilled in the art will appreciate that the distributed system 10 may include a different number of computer systems than shown in FIG. 1. The depiction of four computer systems in the distributed system is merely illustrative.

Figure 2:
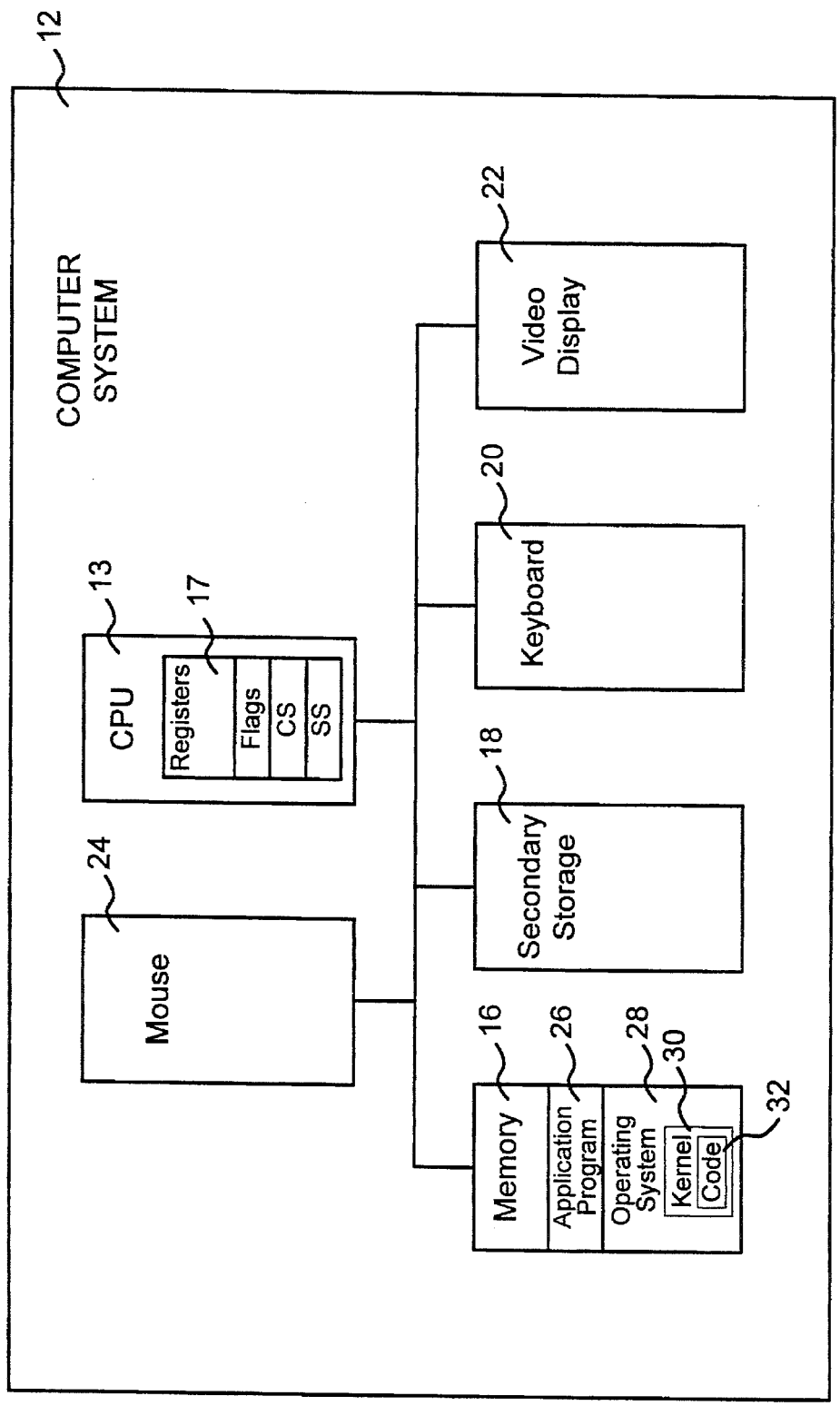
FIG. 2 is a block diagram showing a computer system of FIG. 1 in more detail.

FIG. 2 is a more detailed block diagram of the components contained in one of the computer systems 12. Each of the computer systems need not have this configuration, but this configuration is intended to be merely illustrative. The computer system 12 includes a central processing unit (CPU) 13 and a memory 16. The CPU has a number of registers 17, including a FLAGS register, and a SS (Stack Segment) register. These registers will be described in more detail below. The memory 16 holds a copy of a distributed operating system 28 such as the Microsoft NT Operating System, sold by Microsoft Corporation of Redmond, Washington. In the preferred embodiment of the present invention, each of the computer systems 12 has a copy of the operating system that it runs. The operating system 28 includes a kernel 30, which, in turn, includes a section of code 32 that provides support for performance monitoring. The section of code 32 will be described in more detail below. The memory 16 may also hold at least one application program 26 that may be run on the CPU 13. The application program 26, however, need not reside in memory 16.

The computer system 12 also includes a number of peripheral devices. These peripheral devices include a secondary storage device 18, such as a magnetic disc drive, a keyboard 20, a video display 22 and a mouse 24.

Figure 3:
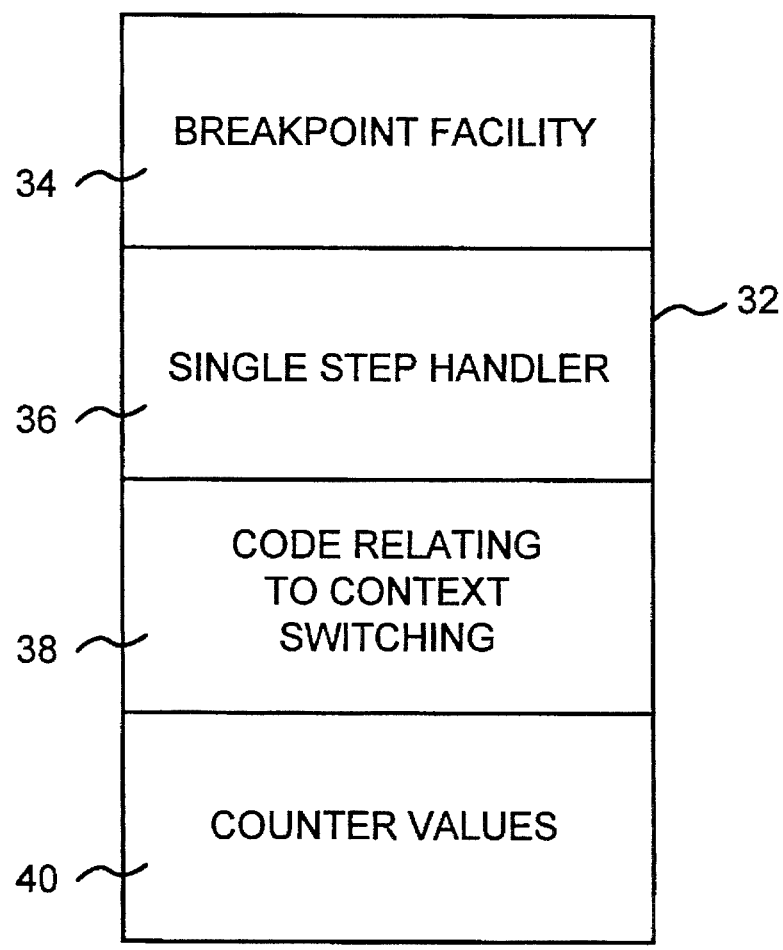
FIG. 3 is a block diagram showing an API of FIG. 2 in more detail.

FIG. 3 is a block diagram showing the section of code 32 in more detail. The API includes a breakpoint facility 34 for supporting the generation of breakpoints within a program run on the CPU 13. The section of code 32 also includes a single step interrupt handler 36 for handling single step interrupts. In order to explain the role served by the breakpoint facility 34 and the single step interrupt handler 36, it is helpful first to review what breakpoints are and what single step interrupts are.

A single step interrupt is an interrupt that is used when a program is single-stepping. Single-stepping refers to a mode of operation of the CPU 13 in which one instruction is executed at a time under the control of a supervisory program. Single-stepping provides a mechanism for debuggers and performance monitors to execute a program slowly to carefully monitor execution of the program. In the present instance, the single step handler 36 is the supervisory program under which a program being monitored executes one instruction at a time. In general, an instruction is executed and then a single step interrupt is generated to switch control of the processor to the supervisory program. Many microprocessors, such as the 80×86 microprocessors, provide a convenient mechanism for switching the microprocessor into single-stepping mode. For the 80×86 microprocessors, a single step trap flag is provided in the FLAGS register (see FIG. 2). When the single step trap flag has a value of one, the processor executes in single step mode and, conversely, when the single step trap flag has a value of zero, the microprocessor does not operate in single-stepping mode.

A breakpoint refers to a breakpoint interrupt that is used to break the uninhibited execution of a program and is helpful in debugging and performance monitoring programs. The difficulty with executing an entire program in single-stepping mode is that it is very slow. In many instances, the majority of a program may already be debugged or tuned and only a small portion needs to be examined in more detail. A breakpoint interrupt is especially suitable in such circumstances. A breakpoint interrupt is generated by inserting a special opcode into a program. This opcode, when executed, causes a breakpoint interrupt to be generated. Upon generation of the breakpoint interrupt, control is transferred to the breakpoint facility 34, which may then perform further actions as needed. The role of breakpoints and single-step interrupts in the preferred embodiment of the present invention will be described in more detail below with regard to the discussion of FIGS. 4 and 5.

In addition to the breakpoint facility 34 and the single step handler 36, the section of code 32 also includes code relating to context switching 38. This code 38 provides a hook for context switches and includes a handler that looks at the context switch and determines whether the new context should be single-stepped or not. If the new context is to be single-stepped, the handler makes certain that single-stepping occurs.

The section of code 32 also includes counter values 40. As was discussed above, the preferred embodiment of the present invention provides a user with an opportunity to monitor the number of instructions executed in the function, the number of times a function is called within a program and the number of instructions executed for each function that is called as a result of calling an initial function. Each of these counts is stored in a separate counter, and the values of the counters are held as counter values 40 in the data area of the section of code 32.

Figure 4:
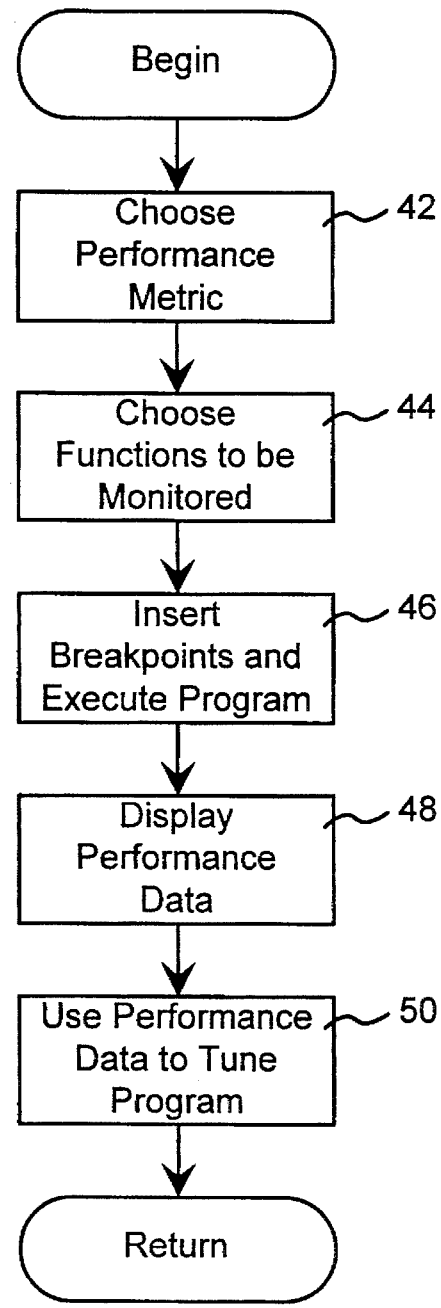
FIG. 4 is a flowchart illustrating the steps performed from a user's perspective in monitoring program performance and tuning the program in accordance with the preferred embodiment of the present invention.

FIG. 4 is a flow chart of the steps performed to monitor the performance of a program or a portion of a program within the preferred embodiment of the present invention. Initially, the user selects a performance metric (step 42). A user interface, such as a menu of dialog box, is provided on the video display 22 (FIG. 2) of the computer system 12 (FIG. 1) that he is using, to enable the user to select the desired performance metric. As was discussed above, there are a number of different performance metrics that may be calculated by the preferred embodiment of the present invention. The user also chooses what functions in the program are to be monitored (step 44). Once the performance metrics have been selected and the functions to be monitored have been selected, opcodes for generating breakpoint interrupts are inserted into each of the functions that is to be monitored, and the program or portion of the program is executed (step 46). The appropriate counter values 40 are calculated as the program is run. The counter values 40 are displayed on the video display 22 as the program executes (step 48 in FIG. 4). When the program or portion of a program is done executing, the user may examine the performance data to guide him in appropriately tuning the program (step 50). How the data is used to tune the program depends upon the type of data that is gathered. Those skilled in the art will appreciate how to use the performance metrics data to appropriately tune the program.

Figure 5:
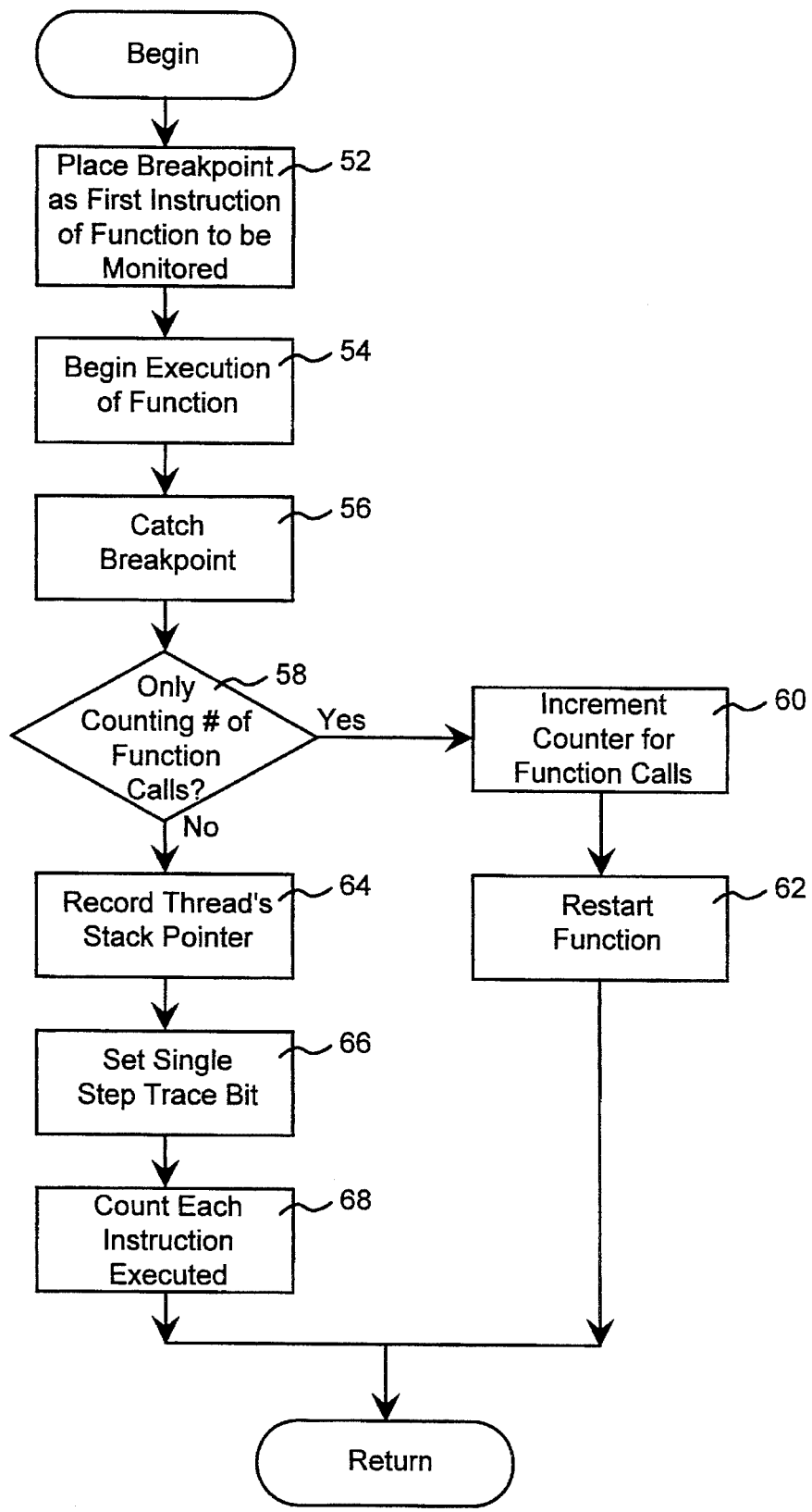
FIG. 5 is a flowchart illustrating in more detail how breakpoints are inserted and how a program is run when monitored by the preferred embodiment of the present invention.

FIG. 5 is a flow chart showing the steps performed on a function-by-function basis in inserting a breakpoint and executing the program (i.e., step 46 FIG. 4) in more detail. As mentioned above, a breakpoint opcode is placed at the first instruction of each function to be monitored (step 52 in FIG. 5). The system then begins execution of the function (step 54). Since the breakpoint is the first instruction in the function, the kernel catches the breakpoint (step 56) and then determines what performance metric the user has requested for the function (step 58). If the only performance metric requested is a count of the number of calls to the function, a counter in the counter values 40 (FIG. 3), that tracks the number of calls to the function, is incremented to indicate that the function has been called (step 60). Once the counter has been incremented, the function is restarted and resumes execution at full speed.

Before considering the steps that are performed in the preferred embodiment of the present invention when the user wishes to monitor the number of instructions executed, it is first helpful to introduce the notion of a "thread" and a "stack." A thread represents an executable portion of a task that can be run independently and concurrently with other threads. The operating system 28 is a multithreading system. Those skilled in the art will appreciate that the present invention need not be practiced in a multithreaded system. It may also be practiced in single process and multiprocessing systems. A multithreading operating system is able to execute multiple threads concurrently. The stack is a last-in-first-out (LIFO) data structure that is used to hold data and register information for the thread. Each thread has a portion of the stack segment dedicated to it. The SS (Stack Segment) register (FIG. 2) points to a segment in memory that holds stacks for the threads of the program being executed. Each thread has a stack pointer (SP) value associated with it that points to the top of its stack (i.e., the portion of the stack segment dedicated to the thread). Those skilled in the art will appreciate that the present invention may also be practiced in environments that do not use stacks.

When in step 58 of FIG. 5 it is determined that the user wishes to count a number of instructions executed rather than counting the number of function calls, the stack pointer for the currently executing thread is recorded in memory 16 (step 64). The single step trap flag in the FLAGS register (FIG. 2) is then set to cause the CPU 13 to enter single-stepping mode (step 66). In single-stepping mode, each time that an instruction is executed, the counter value that keeps track of the number of instructions executed for the current function is incremented (step 68). The instructions are counted until the thread exits the function being monitored or the thread terminates. The instruction counting may also be suspended when a thread deschedules itself, but the instruction counting resumes after the thread is again scheduled.

While the present invention has been described with reference to a preferred embodiment thereof, those skilled in the art will appreciate that various changes in form and detail may be made without departing from the present invention as defined in the appended claims.

We claim:

1. In a data processing system having a processor that runs at a system level or a user level when executing instructions and a storage mechanism for storing an operating system that includes a kernel, a method comprising the steps of:

providing a facility in the kernel of the operating system for counting instructions executed by the processor and a user level monitoring program for monitoring the instructions counted by the facility;

executing a section of code on the processor without recompiling the section of code to embellish the code for profiling;

using the facility in the kernel of the operating system to count the number of instructions executed when the section of code on the processor; and reporting the count of the number of instructions executed to the user level monitoring program.

2. The method recited in claim 1 wherein the section of code that is executed on the processor is part of the kernel of the operating system.

3. The method recited in claim 1 wherein the section of code is executed on the processor by single stepping through instructions in the code.

4. The method recited in claim 1, further comprising the step of storing the count of the number of instructions executed when executing the section of code on the processor in the storage mechanism.

5. The method recited in claim 1 wherein the section of code is a function and the step of executing the section of code on the processor further comprises the step of executing the function on the processor.

6. The method recited in claim 1 wherein the data processing system is a distributed system that also includes a second processor and wherein the method further comprises the steps of:

executing a second section of code on the second processor;

using the facility in the kernel of the operating system to count the number of instructions executed when executing the second section of code on the second processor; and reporting the count of instructions executed when executing the second section of code to the user level monitoring program.

7. The method recited in claim 6, further comprising the step of storing the count of the number of instructions executed when executing the second section of code on the second processor in the storage mechanism.

8. In a data processing system having a processor that runs at a system level or a user level when executing instructions and a storage mechanism for storing an operating system that includes a kernel, a method comprising the steps of:

providing a facility in the kernel of the operating system for counting a number of times that a section of code has been called execution of a program and a user level monitoring program for monitoring the instructions counted by the facility;

executing at least a portion of a program that includes a first section of code on the processor without recompiling the first section of code to embellish the code for profiling;

using the facility in the kernel of the operating system to count a number of times that the first section of code is called during execution of the portion of the program on the processor; and reporting the count to the user level monitoring program.

9. The method recited in claim 8 wherein the program is part of the kernel of the operating system.

10. The method recited in claim 8 wherein the first section of code is executed by single stepping through instructions in the program.

11. The method recited in claim 8, further comprising the step of storing the count of the number of times that the first section of code is called during execution of the portion of the program in the storage mechanism.

12. The method recited in claim 8 wherein the first section of code is a function and the step of using the facility in the kernel of the operating system to count the number of times that the first section of code is called during execution of the portion of the program further comprises the step of using the facility in the kernel of the operating system to count the number of times that the function is called during execution of the portion of the program.

13. The method recited in claim 8 wherein the program includes a second section of code and wherein the method further comprises the step of using the facility in the kernel of the operating system to count a number of times that the second section of code is called during execution of the portion of the program on the processor and reporting the count of times that the second section of code is called to the user level monitoring program.

14. The method recited in claim 8, further comprising the step of storing the count of the number of items that the second section of code is called during execution of the portion of the program on the processor in the storage mechanism.

15. The method recited in claim 8 wherein the data processing system is a distributed system that also includes a second processor and wherein the method further comprises the steps of:

executing at least a portion of a second program that includes a section of code on the processor;

using the facility in the kernel of the operating system to count a number of times that the section of code of the second program is called during execution of the portion of the second program; and reporting the count of the number of times that the section of code of the second program is called to the user level monitoring program.

16. The method recited in claim 15, further comprising the step of storing the count of the number of times that the section of code of the second program is called during the execution of the portion of the second program in the storage mechanism.

17. In a data processing system having a processor capable of running at a system and a user level for executing instructions and a storage mechanism for an operating system having a kernel, a method comprising the steps of:

providing a facility in the kernel of the operating system for counting instructions executed by the processor;

executing a first function that calls other functions in the program on the processor without recompiling the first function to embellish the first function for profiling;

using the facility in the kernel of the operating system to provide separate counts categorized by function of instructions executed in the first function and the other functions when the first function is called during execution of the program; and reporting the counts to the user level monitoring program.

18. The method recited in claim 17 wherein the program is part of the kernel of the operating system.

19. The method recited in claim 17 wherein the first function is executed by single stepping through instructions of the first function.

20. The method recited in claim 17, further comprising the step of storing the separate counts in the storage mechanism.

21. A system for measuring performance of instructions, comprising:

a storage mechanism for storing a user level monitoring program and an operating system that includes a kernel, said kernel comprising a facility for counting instructions that are executed; and a processor comprising:
(i) a program execution unit for executing the monitored program and the user level monitoring program without recompiling the monitored program to embellish the code for profiling;
(ii) a facility invoker for invoking the facility to count the number of instructions executed by at least a portion of the monitored program; and
(iii) a count reporter for reporting the counts gathered by the facility to the user monitoring program.

22. A system for measuring performance of a monitored program of instructions, said monitored program including a function, the system comprising;

a storage mechanism for storing a user level monitoring program and an operating system that includes a kernel, said kernel comprising a facility for counting a number of times that a function is called;

a processor comprising:
(i) a program execution unit for executing the monitored program and the user level monitoring program without recompiling the monitored program to embellish the code for profiling;
(ii) a facility invoker for invoking the facility to count the number of times that the function in the monitored program is called during execution of the monitored program; and
(iii) a count reporter for reporting the count to the user level monitoring program.

* * * * *

UNITED STATES PATENT AND TRADEMARK OFFICE
CERTIFICATE OF CORRECTION

PATENT NO.   : 5,485,574
DATED        : January 16, 1996
INVENTOR(S)  : William J. Bolosky, et. al.

It is certified that error appears in the above-indentified patent and that said Letters Patent is hereby corrected as shown below:

Column 5, claim 1, line 34, following "when", insert --executing--.

Signed and Sealed this

Fourth Day of June, 1996

Attest:

BRUCE LEHMAN

*Attesting Officer*                    *Commissioner of Patents and Trademarks*